Patented Mar. 10, 1931

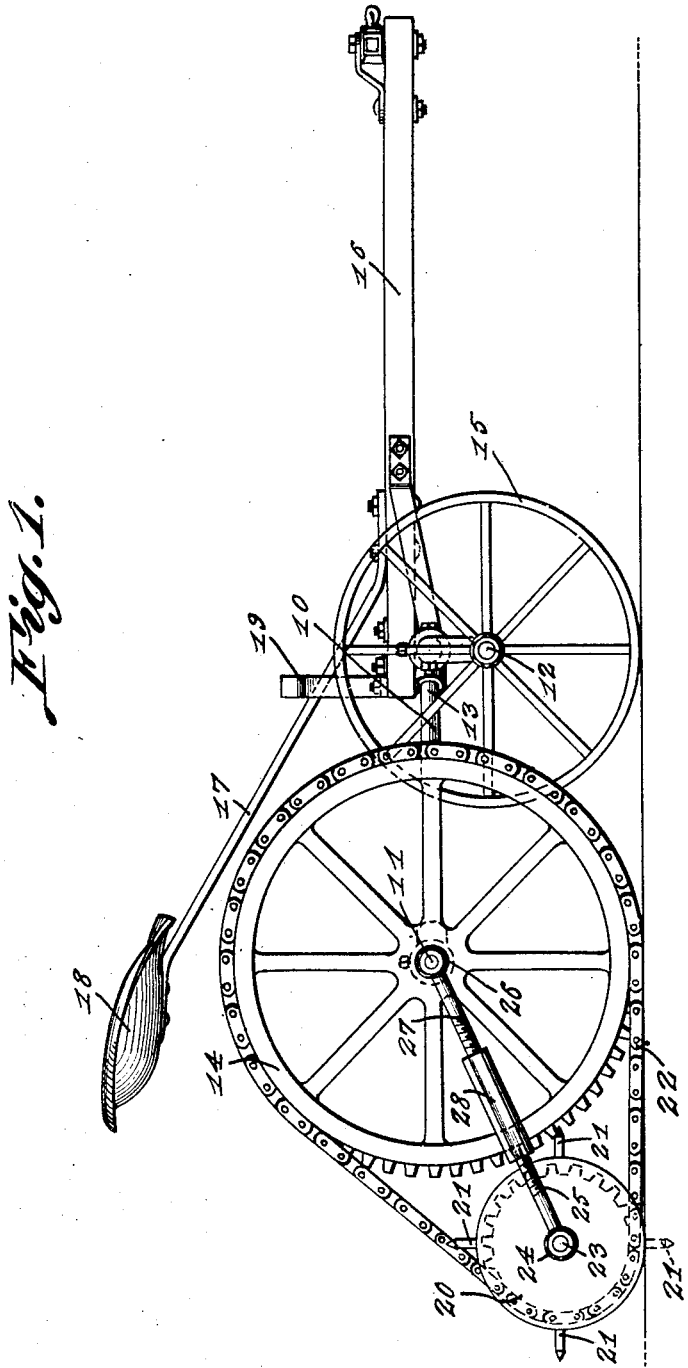

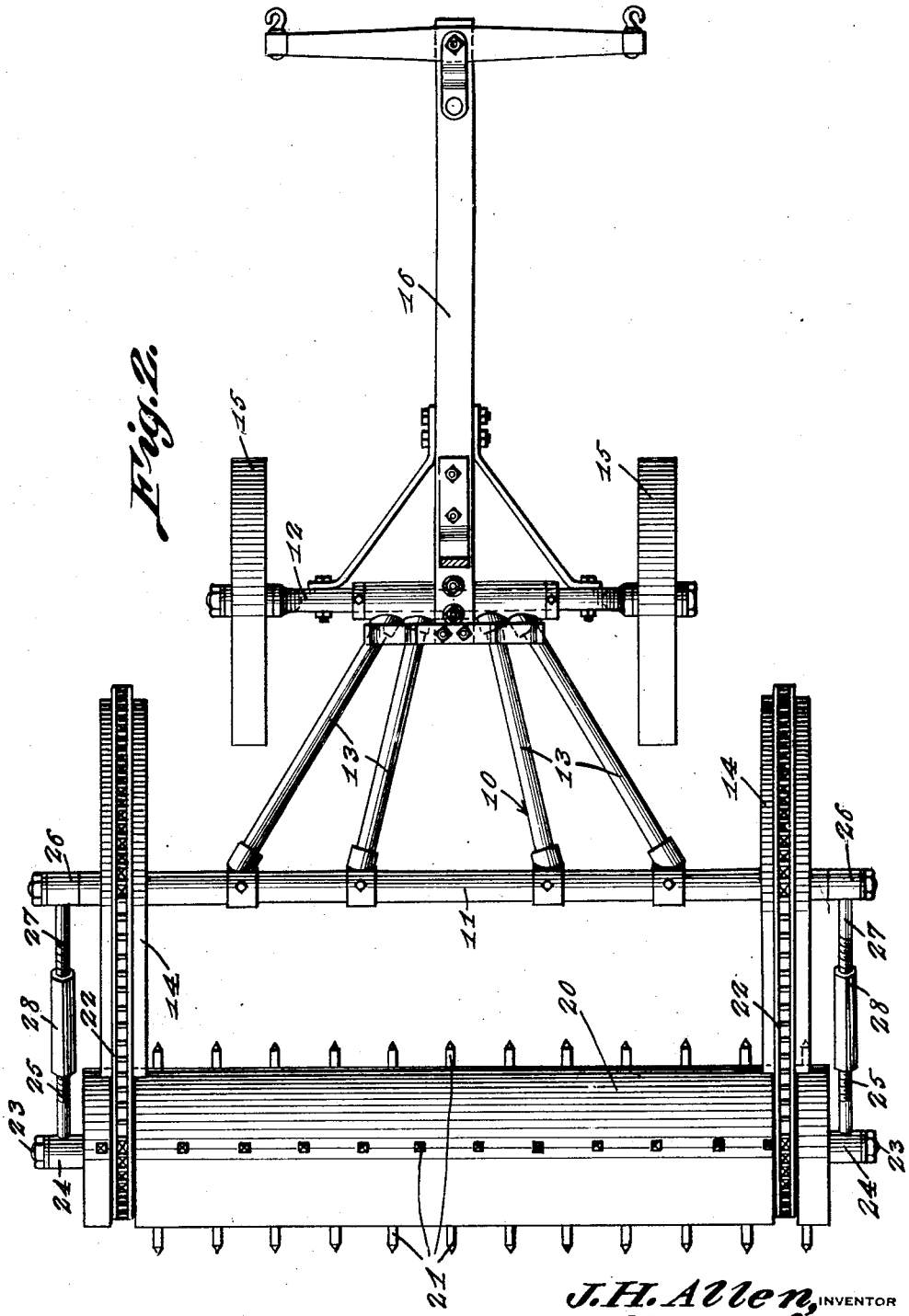

1,796,228

UNITED STATES PATENT OFFICE

JOHN HENRY ALLEN, OF YAKIMA, WASHINGTON

ROTARY WEEDER

Application filed March 10, 1930. Serial No. 434,780.

This invention relates to agricultural machines and has especial relation to weeders.

An object of the present invention is to provide a weeder of the rotary type which is simple and durable in construction, and which includes a rotary member with novel means for driving said member, so as to utilize the driving means to provide traction for the machine.

Another object of the invention is the provision of means for connecting the weeder in the machine, the said means in addition providing means for adjusting the tension of the traction chain.

With the above and other objects in view, the invention further includes the following novel features and details of construction, to be hereinafter more fully described, illustrated in the accompanying drawings and pointed out in the appended claims.

In the drawings:—

Figure 1 is a side elevation of a rotary weeder constructed in accordance with the invention.

Figure 2 is a top plan view of the same.

Referring to the drawings in detail wherein like characters of reference denote corresponding parts, the reference character 10 indicates the frame of the machine which includes a rear axle 11, a front axle 12 and relatively inclined bars 13 which connect the front and rear axles.

The rear axle has radially mounted thereon wheels 14, while the front axle is provided with wheels 15. This axle has pivotal connection with the frame so that the wheels 15 may provide steering wheels. A tongue 16 extends forwardly from the frame and rising from this tongue and extending rearwardly is a bar 17 which carries a seat 18. The reference character 19 indicates foot rests for the occupant of the seat.

The invention further includes a cylinder or roller 20 from which extends ground engaging spikes or fingers 21 so as to provide a rotary weeding member. This member is peripherally grooved to accommodate a chain 22, the latter engaging teeth which extend around the roller within the grooves. This chain 32 also engages teeth provided upon the tread of the wheels 14, so that rotation of the wheels 14 will rotate the roller 20.

The roller 20 has extending from opposite ends trunnions 23. These trunnions may be formed by the opposite ends of a shaft or axle which extends through the roller, or they may be in the form of stub shafts or axles. Mounted upon these trunnions are sleeves 24 which have extending therefrom threaded bars 25.

Mounted upon opposite ends of the axle 11 are similar sleeves 26 having threaded rods 27 extending therefrom. These rods are engaged by internally threaded sleeves 28, so as to provide means for connecting the roller 20 with the axle 11 and means for adjusting the roller with respect to this axle so as to regulate the tension of the chains 22.

The machine may be readily converted into a harrow by substituting a different type of roller for the roller 20, or a plain roller may be substituted so as to provide a rolling machine.

The invention is susceptible of various changes in its form, proportions and minor details of construction and the right is herein reserved to make such changes as properly fall within the scope of the appended claims.

Having described the invention what is claimed is:—

1. In a machine of the character described, front and rear axles, a frame supported thereby, wheels mounted upon the axles, a ground engaging member at the rear of the rear axle, an axle for said member, means connecting the rear axle and the axle of the ground engaging member, and combined traction and driving chains extending around the ground engaging member and the treads of the rear wheels and engaging the ground.

2. In a machine of the character described, front and rear axles, a frame supported thereby, wheels mounted upon the axles, a ground engaging member at the rear of the rear axle, an axle for said member, means connecting the rear axle and the axle of the ground engaging member, combined traction and driving chains extending around the ground engaging member and the treads of the rear wheels and engaging the ground, and means included in the axle connecting means to adjust said axles relatively and regulate the tension of the claims.

In testimony whereof I affix my signature.

JOHN HENRY ALLEN.